(12) United States Patent
Webb et al.

(10) Patent No.: US 9,611,957 B2
(45) Date of Patent: Apr. 4, 2017

(54) PIPE COUPLING

(71) Applicant: TAYLOR KERR (COUPLINGS) LIMITED, Old Beaconsfield, Buckinghamshire (GB)

(72) Inventors: Ian Richard Webb, Gerrards Cross (GB); Neil John Thornton Taylor, Rickmansworth (GB)

(73) Assignee: Taylor Kerr (Couplings) Limited, Buckinghamshire (GB)

( * ) Notice: Subject to any disclaimer, the term of this patent is extended or adjusted under 35 U.S.C. 154(b) by 0 days.

(21) Appl. No.: 15/021,635

(22) PCT Filed: Sep. 9, 2014

(86) PCT No.: PCT/GB2014/052717
§ 371 (c)(1),
(2) Date: Mar. 11, 2016

(87) PCT Pub. No.: WO2015/036740
PCT Pub. Date: Mar. 19, 2015

(65) Prior Publication Data
US 2016/0223104 A1 Aug. 4, 2016

(30) Foreign Application Priority Data
Sep. 13, 2013 (GB) .................................. 1316406.6

(51) Int. Cl.
*F16L 25/00* (2006.01)
*F16L 17/04* (2006.01)
(Continued)

(52) U.S. Cl.
CPC ............. *F16L 17/04* (2013.01); *F16L 21/005* (2013.01); *F16L 21/065* (2013.01); *F16L 21/08* (2013.01)

(58) Field of Classification Search
USPC .................... 285/410, 419, 366, 420, 373
See application file for complete search history.

(56) References Cited

U.S. PATENT DOCUMENTS

| 920,169 A | * 5/1909 | Neuberth ................ F16L 21/06 |
| | | 285/419 |
| 3,737,959 A | 6/1973 | Smith |
| (Continued) | | |

FOREIGN PATENT DOCUMENTS

| CN | 201787512 U | 4/2011 |
| DE | 88 10 716 U1 | 10/1988 |
| (Continued) | | |

OTHER PUBLICATIONS

International Search Report from the European Patent Office of International Application No. PCT/GB2014/052717, dated Nov. 14, 2014, mailed Nov. 21, 2014, pp. 1-5.

*Primary Examiner* — Aaron Dunwoody
(74) *Attorney, Agent, or Firm* — White and Williams LLP

(57) ABSTRACT

The present invention relates to a pipe coupling including a tubular casing, having a longitudinal gap between a first free end and a second free end; a tensioning system including a first pivoting member; a second pivoting member having a projection located at a distal end of the second pivoting member; a bridge plate located inside the casing for spanning the longitudinal gap between the first free end and the second free end of the tubular casing; at least one fastener; and means for restraining radially the projection of the second pivoting member relative to the first pivoting member.

15 Claims, 6 Drawing Sheets

(51) Int. Cl.
*F16L 21/00* (2006.01)
*F16L 21/06* (2006.01)
*F16L 21/08* (2006.01)

(56) References Cited

U.S. PATENT DOCUMENTS

| | | | |
|---|---|---|---|
| 5,271,648 A * | 12/1993 | Krausz | F16L 55/16 24/279 |
| 6,398,267 B1 * | 6/2002 | Detable | F16L 21/005 24/279 |
| 7,472,870 B2 * | 1/2009 | Zagorski | F16L 1/06 138/108 |
| 2006/0208486 A1 | 9/2006 | Kim | |
| 2011/0018263 A1 | 1/2011 | Ignaczak | |
| 2012/0256416 A1 | 10/2012 | Ikeda | |
| 2015/0315954 A1 * | 11/2015 | Edemann | F01N 13/1805 285/420 |

FOREIGN PATENT DOCUMENTS

| | | |
|---|---|---|
| DE | 8810716 U1 | 10/1988 |
| EP | 0 900 346 A | 3/1993 |
| EP | 0 584 784 A1 | 3/1994 |
| EP | 0564784 A1 | 3/1994 |
| FR | 2631678 A1 | 11/1989 |
| FR | 2 775 753 A1 | 9/1999 |
| FR | 2775753 A1 | 9/1999 |
| FR | 2873424 A1 | 1/2006 |
| FR | 2 987 668 A1 | 9/2013 |
| FR | 2987668 A1 | 9/2013 |
| GB | 952178 A | 3/1964 |
| GB | 1225868 A | 3/1971 |
| GB | 2 275 089 A | 8/1994 |
| GB | 2275089 A | 8/1994 |
| JP | H09 79454 A | 3/1997 |
| JP | H0979454 A | 3/1997 |
| WO | 97/45670 A1 | 12/1997 |
| WO | 9745670 A1 | 12/1997 |
| WO | 2009/138982 A2 | 11/2009 |
| WO | 2009138982 A2 | 11/2009 |

* cited by examiner

PIPE COUPLING

CROSS REFERENCE TO RELATED APPLICATIONS

This application claims priority to International Application No. PCT/GB2014/052717, filed Sep. 9, 2014, which claims the benefit of Great Britain Application No. 1316406.6, filed Sep. 13, 2013, the disclosures of which are incorporated herein by reference in their entirety.

BACKGROUND OF THE INVENTION

The present invention relates to pipe couplings, and in particular to a pipe coupling having a tensioning system for applying a radial force to pipes, and for tightening the coupling around the outer surface of the pipes.

A wide variety of pipe couplings for connecting together two pipe ends in a fluid tight manner are known. In order to enable the coupling to function for slightly undersized and slightly oversized pipes, a longitudinal gap between free ends of the casing of the pipe coupling is required.

One known example of a pipe coupling for connecting together two plain-ended pipes in a fluid-tight manner comprises a tubular casing formed with a longitudinal gap, a sealing gasket of resilient flexible material typically of rubber or synthetic rubber, arranged within the casing, and tensioning means for reducing the width of the longitudinal gap so as to tighten the casing around the gasket. In use, the sealing gasket is placed around the adjacent pipe ends and the tensioning means are tightened to clamp the gasket against the outer surfaces of the pipe ends to form a fluid-tight seal.

In use, the fluid pressure in a pipeline tends to deform the casing, and in particular deforms the casing in the region of the free ends on either side of the longitudinal gap. The deformation of the casing reduces the forces acting on the gasket in the region of the free ends. The reduction in forces acting on the gasket decreases the maximum rated fluid pressure for the pipe coupling. In known pipe couplings, additional reinforcing material, additional welding and large and relatively heavy trunnion bar mechanisms have been used to counteract the deformation of the casing and the resultant reduction in forces acting on the sealing gasket.

It would therefore be desirable to provide a novel pipe coupling having improved resistance to deformation in the region of the free ends of the casing, and thus improved resistance to fluid pressure. It would be particularly desirable to provide such a pipe coupling that is lighter, smaller and less expensive to manufacture than pipe couplings having equivalent fluid pressure ratings.

SUMMARY OF THE INVENTION

The present invention relates to a pipe coupling including a tubular casing, having a longitudinal gap between a first free end and a second free end; a tensioning system including a first pivoting member; a second pivoting member having a projection located at a distal end of the second pivoting member; a bridge plate located inside the casing for spanning the longitudinal gap between the first free end and the second free end of the tubular casing; at least one fastener; and means for restraining radially the projection of the second pivoting member relative to the first pivoting member.

BRIEF DESCRIPTION OF THE DRAWINGS

The invention will be further described, by way of example only, with reference to the accompanying drawings in which.

DETAILED DESCRIPTION OF THE DRAWINGS

Figure 1:
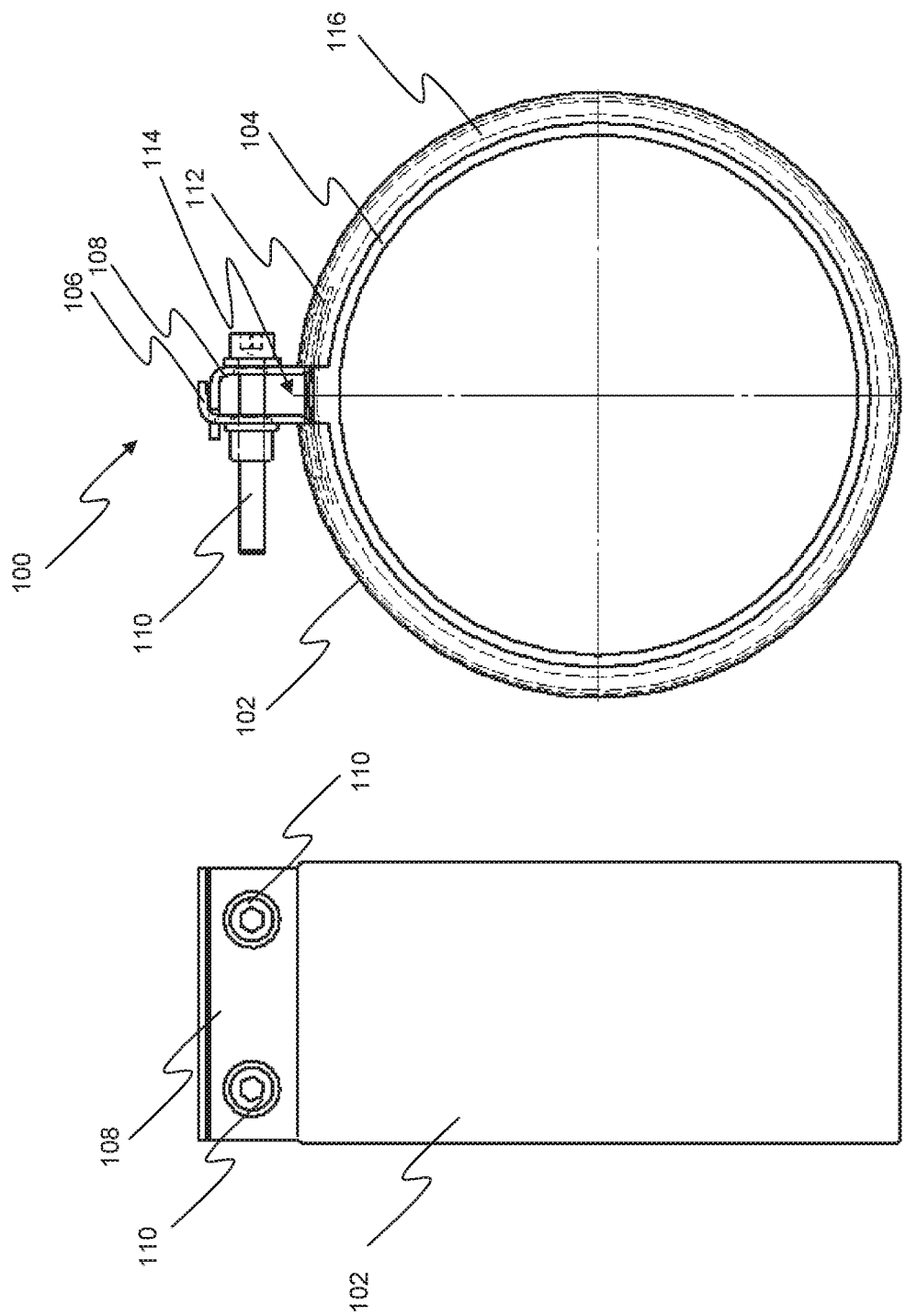
FIGS. 1a-1b show a side view and an end view of a pipe coupling according to the invention.

According to the present invention there is provided a pipe coupling comprising: a tubular casing, having a longitudinal gap between a first free end and a second free end, for fitting around a pipe; and a tensioning system for tightening the casing around the outer surface of the pipe, the system comprising: a first pivoting member, extending radially from the first free end of the tubular casing; a second pivoting member, extending radially from the second free end of the tubular casing, having a projection located at a distal end of the second pivoting member and extending towards the first pivoting member; a bridge plate located inside the casing for spanning the longitudinal gap between the first free end and the second free end of the tubular casing; at least one fastener; and means for restraining radially the projection of the second pivoting member relative to the first pivoting member. Upon tightening the or each fastener, the first pivoting member and the second pivoting member pivot about the projection, and the first pivoting member and the second pivoting member resiliently bend about the first free end of the tubular casing and the second free end of the tubular casing respectively, such that each proximal end of the first pivoting member and the second pivoting member are drawn together to both tighten the casing around the outer surface of the pipe and to apply a radial force to the bridge plate.

By providing such a pair of pivoting members, the force applied to the tensioning system by the fastener can be translated into a circumferential force to tighten the casing around the outer surface of the pipes, and into a radial force on the bridge plate in the region of the longitudinal gap. By resiliently bending the pivoting members away from each other about the free ends of the casing, the resultant force applied to the casing is an inward radial force which in turn acts on the bridge plate. The bridge plate therefore applies an inward radial force in the region of the longitudinal gap to increase the resistance to fluid pressure in the pipes.

Thus, such a tensioning system provides for a reduction in the complexity, size and weight of the pipe coupling as compared to known pipe couplings. Furthermore, the simplicity of the tensioning system enables the pipe coupling to be manufactured, and assembled, more easily and more cheaply than equivalent pipe couplings.

The pipe coupling of the present invention is particularly suitable for use in areas having restricted space since the sections of the coupling that protrude from the casing are smaller than known comparable pipe couplings, and thus the coupling has a lower profile than the known comparable pipe couplings. In addition, the pipe coupling of the present invention eliminates the need for hot working, such as welding, on site during the installation of pipe.

As used herein, the term 'axial' is used to refer to the direction defined by the longitudinal axis of the pipe and the term 'radial' is used to refer to a direction defined by a radius of the pipe. The terms 'proximal' and 'distal' are used describe the relative positions of components, or portions of components, of the pipe coupling. As such, 'proximal' components, or portions of components, are nearer to the point of attachment to other components than 'distal' components, or portions of components.

As used herein, the term 'fastener' refers to any suitable means for applying a compressive force to draw together the first pivoting member and the second pivoting member, and includes screws, bolts used with either a standard nut or a clinch nut, rivets, clamps or latches.

The tensioning system may comprise one, two, three, four or more fasteners depending on the type of fastener used and the size of the pipe coupling.

In embodiments comprising a fastener having a shaft such as a screw, bolt, or rivet, the shaft of the fastener may pass through an elongate slot provided in the first pivoting member of the second pivoting member. The slot is preferably elongate in the radial direction to enable the head of the fastener to slide against the respective first pivoting member or second pivoting member as the fastener is tightened.

In a preferred embodiment, the at least one fastener comprises a bolt and clinch nut, the clinch nut being attached to one of the first pivoting member and the second pivoting member.

The pipe coupling may further comprise a first foot resiliently coupled to the proximal end of the first pivoting member and extending away from the second pivoting member, and a second foot resiliently coupled to the proximal end of the second pivoting member and extending away from the first pivoting member. The first foot is preferably connected to the first free end of the tubular casing, and the second foot is preferably connected to the second free end of the tubular casing.

The first foot and the second foot may be connected to the tubular casing by any suitable means including but not limited to: welding, particularly spot welding; bonding, such as using adhesive; and soldering.

The first foot and the second foot may be integrally formed with the first pivoting member and the second pivoting member respectively.

As used herein, the term 'integrally formed' refers to portions of components being manufactured from a single piece of material. In preferred embodiments, the 'integrally formed' components described herein are formed by bending sheet material, such as in a brake press, a roll bender or other such suitable machinery that will be known to the skilled person.

In an alternative embodiment, the first foot and the second foot are integrally formed with the first free end of the tubular casing and the second free end of the tubular casing respectively.

The projection from the second pivoting member is preferably resiliently coupled to the second pivoting member. Preferably, the projection from the second pivoting member is integrally formed with the second pivoting member.

The restraining means preferably comprises a projection located at a distal end of the first pivoting member and extending towards the second pivoting member. The projection of the first pivoting member engages with the projection of the second pivoting member to substantially prevent relative radial movement between the first pivoting member and the second pivoting member. The projection from the first pivoting member is preferably integrally formed with the first pivoting member.

The restraining means may further comprise a slot and key arrangement. The first pivoting member is preferably provided with a slot having a main axis along the longitudinal direction of the pipe coupling and the projection of the second pivoting member has a key adapted to engage with the slot of the first pivoting member to substantially prevent relative radial movement between the first pivoting member and the second pivoting member. It is of course to be understood that the second pivoting member may be provided with the slot, and the first pivoting member provided with the key.

At least one of the first pivoting member and the second pivoting member may be convex, such that upon tightening the or each fastener the convex pivoting member is straightened. In one embodiment, both the first pivoting member and the second pivoting member are convex. The degree of curvature of the convex pivoting members is such that sufficient tension for coupling the pipes together has been applied to the fasteners when the pivoting members are substantially straight. Thus, a visual cue is provided as to when the pipe coupling is correctly installed. In this way, the present invention enables power tools, such as battery-operated screwdrivers, to be used to tighten the fasteners, and thus the time taken to install the pipe coupling may be reduced as compared to known pipe couplings. Furthermore, the need for torque wrenches to ensure sufficient torque has been applied to the fasteners is eliminated.

As used herein, the term 'convex' is used to describe the curvature of the pivoting members, wherein the convex form of the pivoting member means that each pivoting member curves away from the longitudinal gap between the free ends of the tubular casing.

The casing may be of generally U-shaped cross-section having a web portion with flanges projecting radially inwardly from the axial ends of the web portion to define an annular channel.

The pipe coupling may further comprise a tubular sealing gasket located inside the casing. In use of the pipe coupling, as the casing is tightened around the pipe ends, the casing presses the sealing gasket against the outer surfaces of the pipe ends to form seals. The first pivoting member and the second pivoting member press against the bridge plate, which in turn presses the sealing gasket against the outer surfaces of the pipe ends to form seals in the region of the longitudinal gap between the two free ends of the casing. Suitable sealing gaskets for use in a pipe coupling of this construction will be known to the skilled person, and may be made of resilient flexible material typically of rubber or synthetic rubber, or any other suitable material.

The first pivoting member and the second pivoting member are preferably plates extending along the longitudinal direction of the casing. The first pivoting member and the second pivoting member preferably extend along the entire longitudinal length of the casing. The pipe coupling may further comprise reinforcing plates connected to the plates of each of the first pivoting member and the second pivoting member. The reinforcing plates may be welded, bonded or soldered to the plates. The reinforcing plates allow a higher tightening force to be applied to the fasteners to enable higher pressure resistance.

Each of the first pivoting member and the second pivoting member may comprise a plurality of sections, each section being separated from each other plate by a gap along the longitudinal length of the casing. Each set of pivoting member sections, comprising a first pivoting member section and a second pivoting member section, preferably has at least one fastener. In this way, two pipes of slightly non-uniform diameter can be more easily coupled together with the appropriate coupling force on each pipe. The tightening force applied to the each fastener of each set of pivoting member sections may be different, such that the coupling would allow two pipes, each of different hardness, to be coupled together without deforming the softer pipe, and while applying sufficient force to the harder pipe to effect a suitable seal.

The pipe coupling may further comprise reinforcing plates connected to the tubular casing adjacent the free ends. The reinforcing plates may be welded, bonded or soldered to the tubular casing. The reinforcing plates are configured to reduce the deformation of the tubular casing under load.

The bridge plate is preferably coupled to one of the first free end or the second free end of the tubular casing. The bridge plate may be welded, bonded or soldered to one of the first free end or the second free end of the tubular casing. Coupling the bridge plate to the tubular casing enables the pipe coupling to be installed more easily.

The tubular casing will typically be formed of a strip of metal or other material formed into a tube with a gap extending longitudinally of the casing between the free ends of the strip, wherein the free ends of the strip are interconnected by the tensioning means. The bridge plate will therefore typically be formed in a part-cylindrical shape with a radius of curvature similar to that of the casing. The casing on either side of the longitudinal gap overlaps with the bridge plate.

In certain embodiments of the invention, the bridge plate may extend substantially around the full circumference of the pipe coupling. In these embodiments, the tubular casing comprises an outer casing as described above and the bridge plate as an inner casing fitted within the outer casing. Preferably, the inner casing is fitted entirely within the outer casing. The outer casing and inner casing preferably both have longitudinal gaps wherein the gap in the inner casing is circumferentially offset from the gap in the outer casing. A suitable arrangement of outer and inner casings would be known to the skilled person and is described, for example, in GB-A-2 275 089.

Preferably, a layer of fire-resistant thermally-insulating material is disposed between the inner and outer casings whereby the inner and outer casings are thermally insulated from one another. This feature enables a fire-resistant pipe coupling to be provided which can withstand extremely high temperatures without deterioration. Details of a suitable fire shield for incorporating into the pipe coupling of the present invention can be found, for example, in EP-A-0 900 346.

The pipe coupling may further comprise at least one arcuate gripping ring having inwardly projecting gripping teeth, located in the tubular casing. The gripping ring preferably forms a complete ring. In a preferred embodiment a plurality of arcuate segments are provided which overlap to form a complete ring. The or each arcuate gripping ring is preferably frusto-conical.

In the embodiment comprising a gripping ring, the ring is preferably formed in two segments. The segments comprise a major segment which subtends an arc of greater than 180° at the axis of the gripping ring and a minor segment which subtends an arc of less than 180° at the axis of the gripping ring. The casing is formed with a longitudinal gap and the tensioning means is arranged to reduce the longitudinal gap when tightened, the minor segment is located adjacent the longitudinal gap and the major segment is located to the side of the casing remote from the longitudinal gap, the major and minor segments overlapping one another on either side of the gap.

The pipe coupling may be suitable for any pipe having an external diameter of between about 21 mm and about 4500 mm. The pipe coupling of the present invention also accommodates typical pipe tolerances in accordance with, for example, BS EN 877:1999.

Any feature in one aspect of the invention may be applied to other aspects of the invention, in any appropriate combination. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

FIG. 1 shows one embodiment of a pipe coupling 100 according to the present invention. The pipe coupling 100 comprises a tubular casing 102, a sealing gasket 104 and a tensioning system. The tensioning system comprises a first pivoting member 106, a second pivoting member 108, two fasteners 110 and a bridge plate 112.

The casing 102 is formed of a rolled steel strip, formed into a tube with a longitudinal gap 114 between the free ends of the strip. The axial end margins of the casing 102 are bent inwardly at right angles to a tubular web portion of the casing to form flanges 116 projecting inwardly towards the central axis of the casing.

The bridge plate 112, similarly to the casing 102, is formed of a rolled steel strip having a radius of curvature substantially equal to that of the casing 102. The casing 102 on either side of the longitudinal gap 114 overlaps the bridge plate 112. The axial length of the bridge plate 114 is slightly less than that of the casing 102 so that the bridge plate 114 fits inside the flanges 116 of the casing 102.

The sealing gasket 104 is of an elastomeric material, for example rubber or synthetic rubber. The inner surface of the sealing gasket is formed with raised sealing surfaces for contacting the outer surface of the pipe when the pipe coupling 100 is in place. The sealing gasket 104 fits inside the casing 102 and the bridge plate 114.

Figure 2:
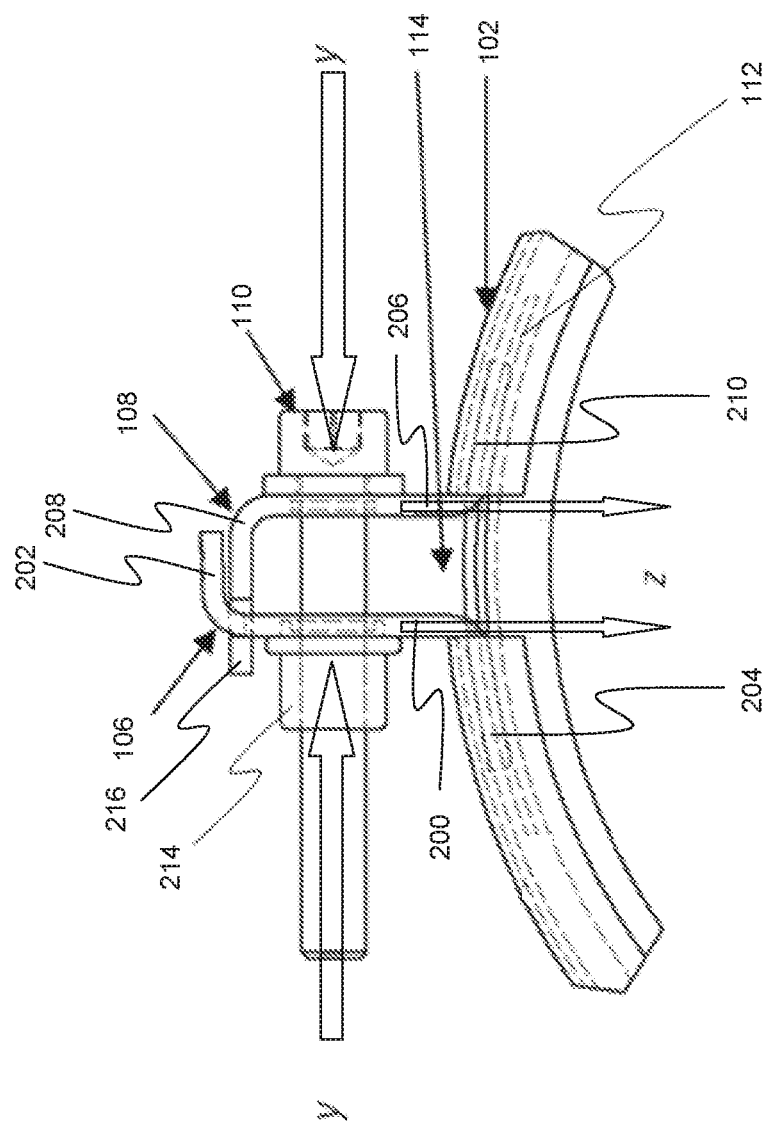
FIG. 2 shows a detailed end view of a pipe coupling according to the invention depicting the forces acting through the coupling.
Figure 3A:
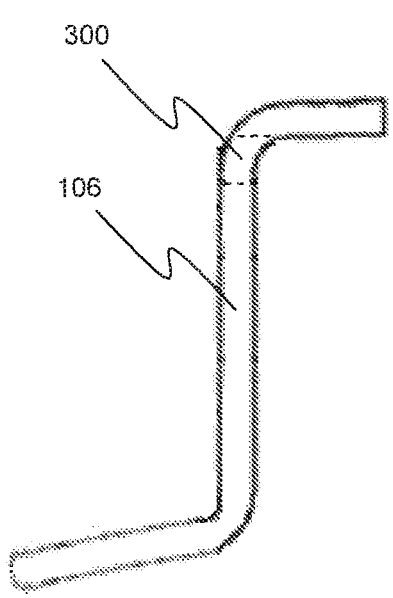
FIGS. 3a-3d show a detailed view of the pivoting members of a pipe coupling according to the invention.
Figure 3C:
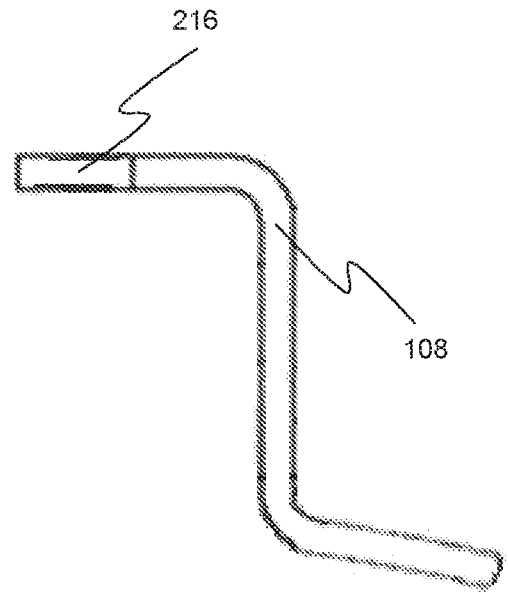
Figure 3B:
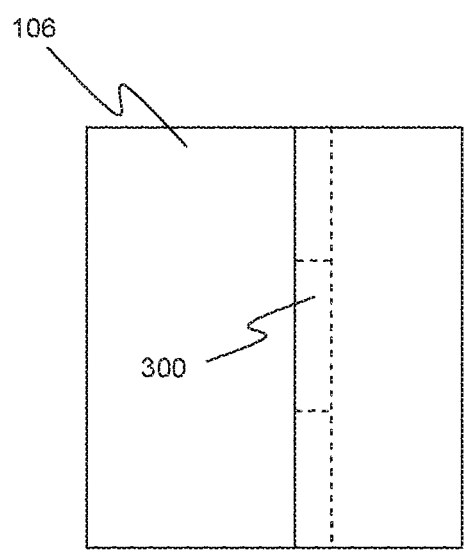
Figure 3D:
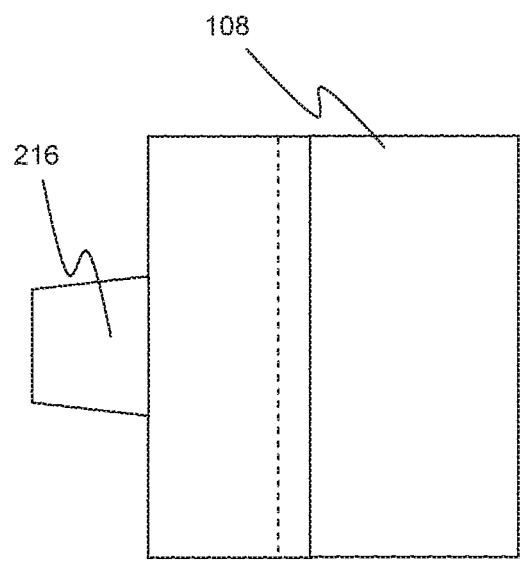

Referring to FIG. 2, a main plate portion 200 of the first pivoting member 106 extends radially away from the casing 102 and comprises: a projection 202 at the distal end of the main plate portion 200 extending towards the second pivoting member 108; and a foot 204 at the proximal end of the main plate portion 200 extending away from the second pivoting member 108. The main plate portion 200, the projection 202 and the foot 204 are integrally formed of a single piece of sheet material by bending the sheet material in a brake press or the like. The foot 204 is connected, for example by spot welding, to a first free end of the casing 102.

A main plate portion 206 of the second pivoting member 108 extends radially away from the casing 102 and comprises: a projection 208 at the distal end of the main plate portion 206 extending towards the first pivoting member 106; and a foot 210 at the proximal end of the main plate portion 206 extending away from the first pivoting member 106. The main plate portion 206, the projection 208 and the foot 210 are integrally formed of a single piece of sheet material by bending the sheet material in a brake press or the like. The foot 210 is connected, for example by spot welding, to a second free end of the casing 102.

The main plate portion 206 of the second pivoting member is provided with two through holes through which pass the bolts 212 of the fasteners 110. The main plate portion 200 of the first pivoting member is provided with two through holes within which are provided two clinch nuts 214 for accepting the two bolts 212.

Referring to FIGS. 2 and 3, the main plate portion 200 of the first pivoting member comprises a slot 300 adapted to receive a key 216 which extends from the projection 208 of the second pivoting member. In use, when the fasteners are tightened, the slot and key arrangement prevents relative radial movement of the first pivoting member 106 with respect to the second pivoting member 108.

In use, when the fasteners 110 are tightened a compressive force y is applied, through the fasteners, to the first pivoting member 106 and the second pivoting member 108. As the fasteners 110 are tightened the key 216 engages with the slot 300, and the projection 208 engages with the corner of the main plate portion 200 and the projection 202 of the first pivoting member. Upon engagement, further relative tangential movement of the respective distal ends of the first and second pivoting members is prevented. As the fasteners 110 are further tightened the proximal ends of the first and second pivoting members are drawn together, pivoting around the interface between the slot and key, reducing the longitudinal gap 114. Thus, the casing is tightened around the ends of the pipes being coupled.

Figure 4:
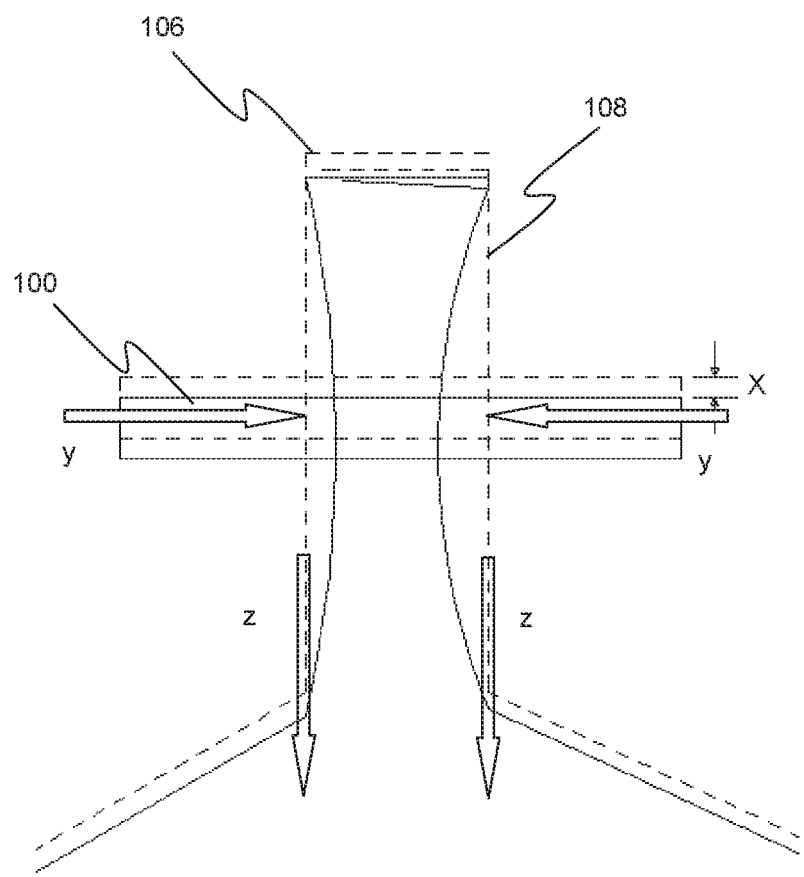
FIG. 4 shows a detailed end view of a closed pipe coupling according to the invention.

As can be seen in FIGS. 2 and 4, as the proximal ends are drawn together the force y is transmitted through the first and second pivoting members to generate an inwardly radial force z which acts, through the bridge plate, on the sealing gasket to improve the seal in the region of the longitudinal gap. Since the distal ends of the foots 204 and 210 are restrained in the radial direction both by the casing and the pipe, drawing the pivoting members together results in an inwardly radial force acting on the bridge plate and an inwardly radial deflection X of the fasteners. In this system, the bends between the foot 210 and the main plate portions 206 act as a spring having a spring coefficient $K_1$, and bend between the projection 208 and the main plate portion 206 acts as a spring having a spring coefficient $K_2$. The spring coefficient $K_1$ is less than the spring coefficient $K_2$ and thus the deflection at the proximal end of the second pivoting member is greater than at the distal end of the pivoting member.

Figure 5:
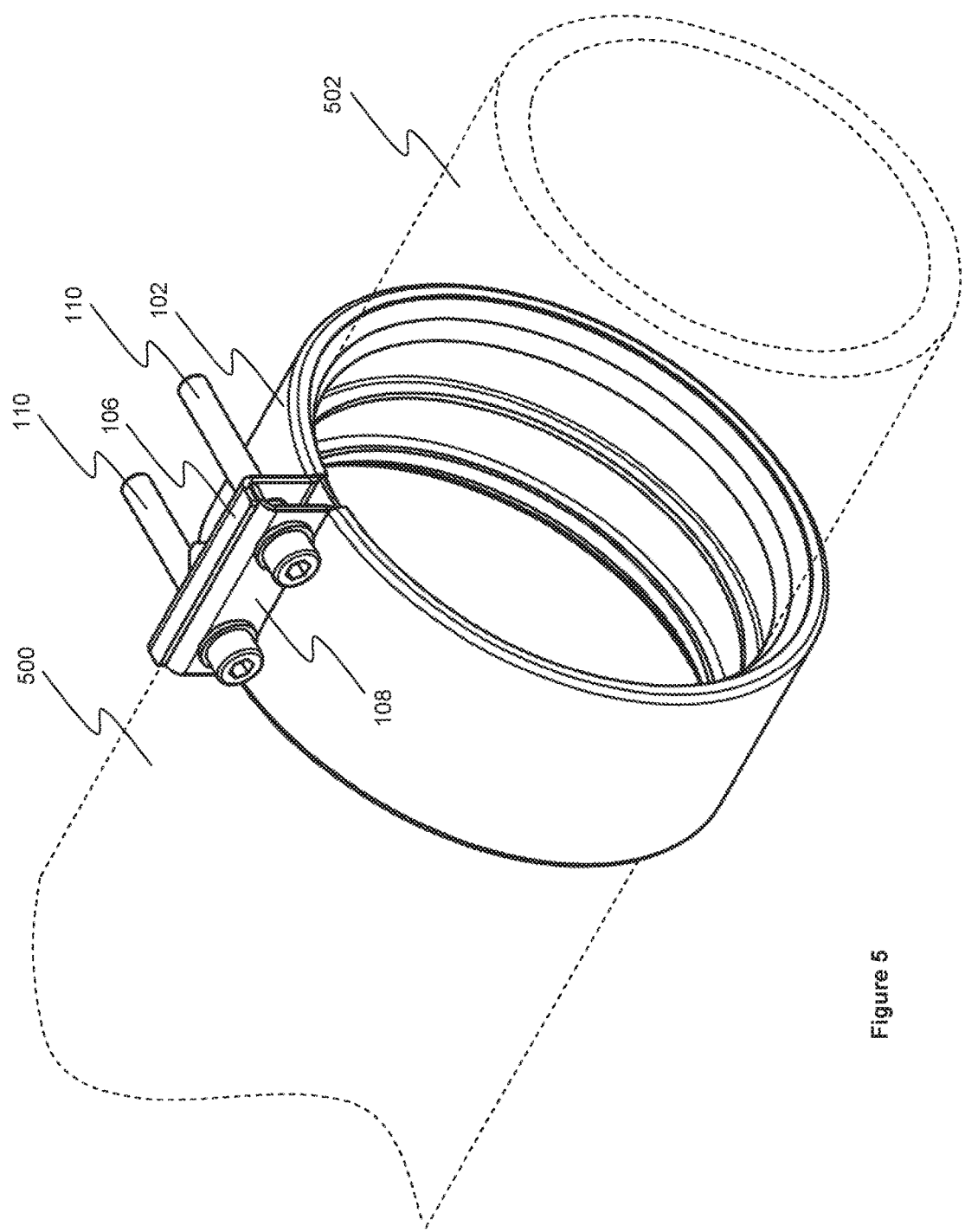
FIG. 5 shows an isometric view of a pipe coupling according to the invention coupling the ends of two pipes.

FIG. 5 shows an isometric view of a pipe coupling 100 according to the invention coupling the ends of two pipes 500 and 502.

Figure 6:
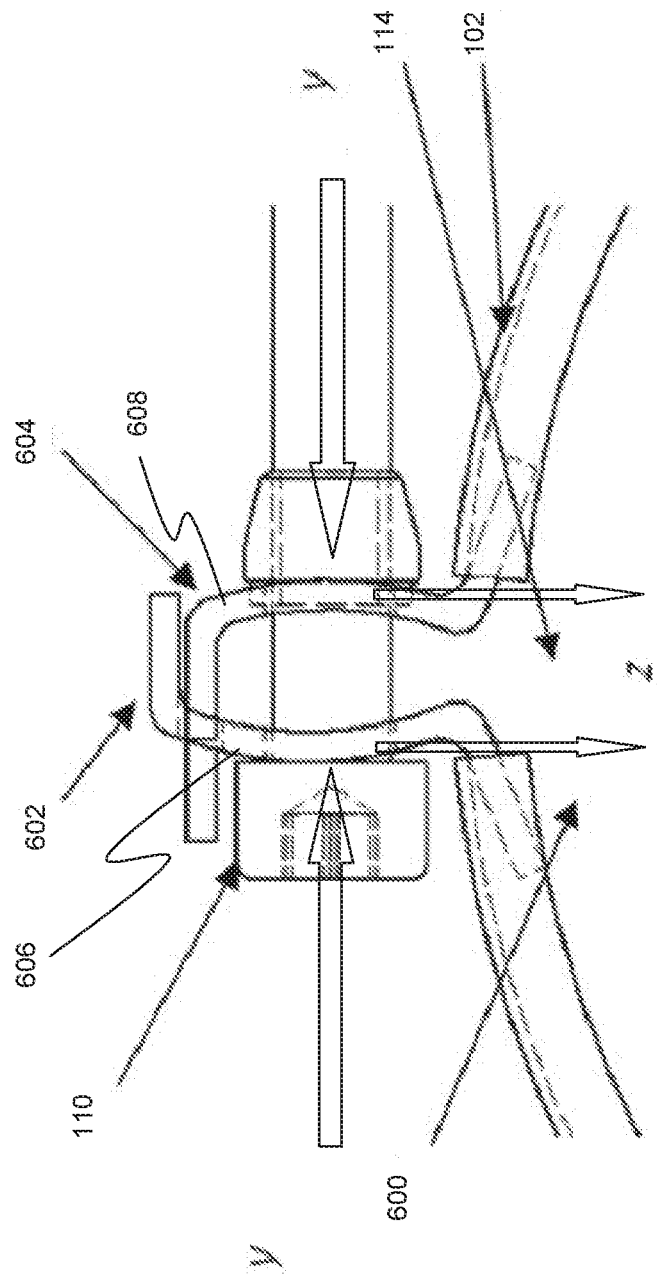
FIG. 6 shows a detailed end view of an alternative pipe coupling according to the invention depicting the forces acting through the coupling.

FIG. 6 shows an alternative embodiment of a tensioning system for a pipe coupling of the present invention for coupling pipes 600. The tensioning system is similar to the tensioning described above with reference to FIGS. 1 to 5, and like components have like reference numerals. The remainder of the pipe coupling incorporating the tensioning system shown in FIG. 6 is the same as that shown in FIGS. 1 to 5.

As can be seen in FIG. 6, the tensioning system comprises a first pivoting member 602 and a second pivoting member 604. The first pivoting member 602 and the second pivoting member 604 have the same features as their equivalent counter-parts shown in FIGS. 1 to 5, but the main plate portions 606 and 608 respectively are convex such that they curve away from each other. In use, as the fasteners 110 are tightened the main plate portions 606 and 608 straighten, and the foot portions act on the bridge plate (not shown) in a similar manner to that described above. The convex main plate portions are used as a visual cue, or indicator, as to when sufficient torque has been applied to the fasteners. As such, the installer knows that when the main plate portions are substantially straight the pipe coupling has been installed correctly.

The invention claimed is:

1. A pipe coupling comprising:
a tubular casing, having a longitudinal gap between a first free end and a second free end, for fitting around a pipe;
a tensioning system for tightening the casing around the outer surface of the pipe, the system comprising:
a first pivoting member, extending radially from the first free end of the tubular casing;
a second pivoting member, extending radially from the second free end of the tubular casing, having a projection located at a distal end of the second pivoting member and extending towards the first pivoting member;
a bridge plate located inside the casing for spanning the longitudinal gap between the first free end and the second free end of the tubular casing;
at least one fastener; and
means for restraining radially the projection of the second pivoting member relative to the first pivoting member, comprising:
a slot and key arrangement, wherein the first pivoting member is provided with a slot having a main axis along the longitudinal direction and the projection of the second pivoting member having a key adapted to engage with the slot of the first pivoting member to substantially prevent relative radial movement between the first pivoting member and the second pivoting member,
wherein, upon tightening the or each fastener, the first pivoting member and the second pivoting member pivot about the projection, and the first pivoting member and the second pivoting member resiliently bend about the first free end of the tubular casing and the second free end of the tubular casing respectively, such that each proximal end of the first pivoting member and the second pivoting member are drawn together to both tighten the casing around the outer surface of the pipe and to apply a radial force to the bridge plate.

2. A pipe coupling according to claim 1, further comprising: a first foot resiliently coupled to the proximal end of the first pivoting member and extending away from the second pivoting member; and a second foot resiliently coupled to the proximal end of the second pivoting member and extending away from the first pivoting member.

3. A pipe coupling according to claim 2, wherein the first foot is connected to the first free end of the tubular casing, and the second foot is connected to the second free end of the tubular casing.

4. A pipe coupling according to claim 3, wherein the first foot and the second foot are integrally formed with the first pivoting member and the second pivoting member respectively.

5. A pipe coupling according to claim 1, wherein the projection from the second pivoting member is resiliently coupled to the second pivoting member.

6. A pipe coupling according to claim 5, wherein the projection from the second pivoting member is integrally formed with the second pivoting member.

7. A pipe coupling according to claim 1, the restraining means comprising a projection located at a distal end of the first pivoting member and extending towards the second pivoting member, wherein the projection of the first pivoting member engages with the projection of the second pivoting member to substantially prevent relative radial movement between the first pivoting member and the second pivoting member.

8. A pipe coupling according to claim 7, wherein the projection from the first pivoting member is integrally formed with the first pivoting member.

9. A pipe coupling according to claim 1, wherein at least one of the first pivoting member and the second pivoting member is convex, such that upon tightening the or each fastener the convex pivoting member is straightened.

10. A pipe coupling according to claim 1, wherein the casing is of generally U-shaped cross-section having a web portion with flanges projecting radially inwardly from the axial ends of the web portion to define an annular channel.

11. A pipe coupling according to claim 1, further comprising a tubular sealing gasket located inside the casing.

12. A pipe coupling according to claim 1, wherein the first pivoting member and the second pivoting member are plates extending along the longitudinal direction of the casing.

13. A pipe coupling according to claim 1, further comprising reinforcing plates connected to the tubular casing adjacent the free ends.

14. A pipe coupling according to claim 1, wherein the bridge plate is coupled to one of the first free end or the second free end of the tubular casing.

15. A pipe coupling according to claim 1, further comprising at least one arcuate gripping ring having inwardly projecting gripping teeth, located in the tubular casing.

* * * * *